United States Patent
Haiderer et al.

(10) Patent No.: US 12,492,697 B1
(45) Date of Patent: Dec. 9, 2025

(54) SYSTEM AND METHOD FOR REDUCED THREAD STRESS FOR BUTTRESS STYLE THREADS USED IN FRAC PUMP FLUID ENDS

(71) Applicant: SPM Oil & Gas Inc., Fort Worth, TX (US)

(72) Inventors: Jeffrey R. Haiderer, Fort Worth, TX (US); Chandu Kumar, Fort Worth, TX (US); Ralph E. Harris, Fort Worth, TX (US); Connor Landrum, Godley, TX (US)

(73) Assignee: SPM Oil & Gas, Forth Worth, TX (US)

( * ) Notice: Subject to any disclaimer, the term of this patent is extended or adjusted under 35 U.S.C. 154(b) by 0 days.

(21) Appl. No.: 18/968,623

(22) Filed: Dec. 4, 2024

(51) Int. Cl.
*F04B 53/16* (2006.01)
*B23G 1/16* (2006.01)

(52) U.S. Cl.
CPC ............... *F04B 53/16* (2013.01); *B23G 1/16* (2013.01)

(58) Field of Classification Search
CPC .... F04B 53/16; F16L 55/1108; F16L 55/1152
See application file for complete search history.

(56) References Cited

U.S. PATENT DOCUMENTS

| | | | |
|---|---|---|---|
| 6,623,259 B1 | 9/2003 | Blume | |
| 10,519,950 B2 * | 12/2019 | Foster | F16K 5/0492 |
| 10,570,896 B1 * | 2/2020 | Guerra | F16L 21/08 |
| 10,815,988 B2 | 10/2020 | Buckley | |
| 10,857,626 B2 | 12/2020 | Stribling et al. | |
| 10,941,765 B2 * | 3/2021 | Nowell | F04B 39/10 |
| 11,225,861 B1 | 1/2022 | Dille et al. | |
| 11,231,064 B2 | 1/2022 | Chunn | |
| 11,635,074 B2 * | 4/2023 | Rodriguez | E21B 43/2607 417/437 |
| 11,815,085 B1 | 11/2023 | Brunet | |
| 11,859,643 B2 | 1/2024 | Peer | |
| 2019/0072088 A1 * | 3/2019 | DeLeon, II | F04B 53/16 |
| 2022/0186718 A1 | 6/2022 | Peer | |

* cited by examiner

Primary Examiner — Michael Leslie

(57) ABSTRACT

A fluid end for a reciprocating pump assembly includes a fluid end body defining an access opening having access opening threads formed on an inner surface thereof and extending between an inner threaded portion and an outer threaded portion. A blunt start is formed at the outer threaded portion of the access opening threads. The fluid end also includes a retainer nut having retainer nut threads formed on an outer surface of the retainer nut. To install the retainer nut in the fluid end, a first threaded portion of the retainer nut threads is configured to engage with the access opening threads before the second threaded portion. When the retainer nut is in a fully engaged position in the access opening, a second threaded portion of the retainer nut threads is offset from the blunt start of the access opening threads to define a circumferential offset distance therebetween.

14 Claims, 11 Drawing Sheets

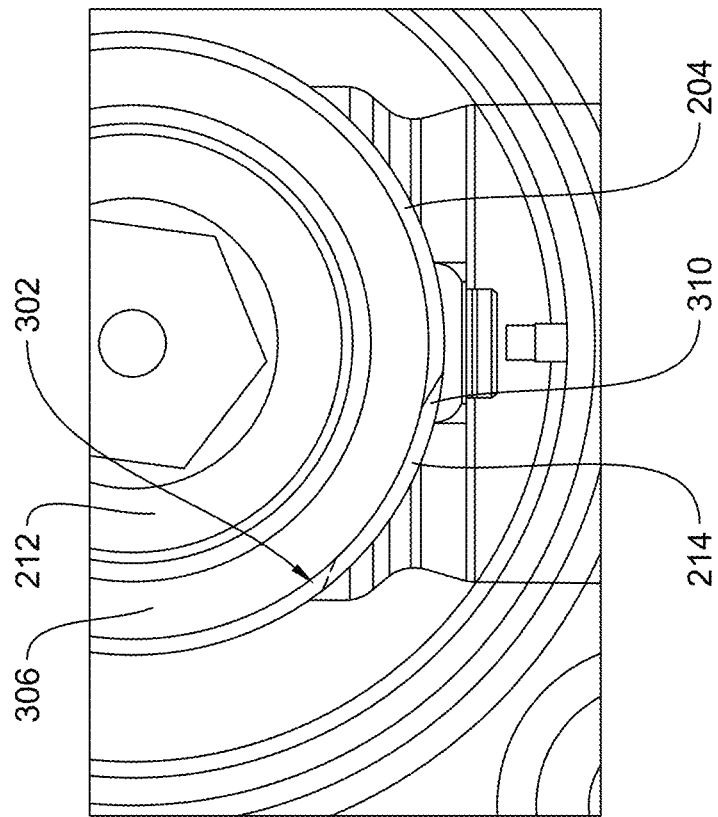
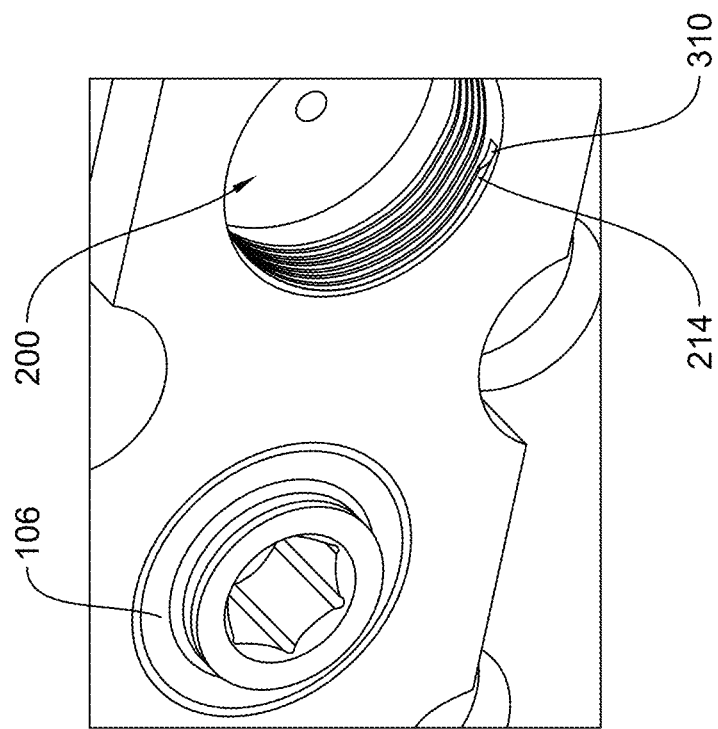
FIG. 9B
FIG. 9A

SYSTEM AND METHOD FOR REDUCED THREAD STRESS FOR BUTTRESS STYLE THREADS USED IN FRAC PUMP FLUID ENDS

TECHNICAL FIELD

The present implementations relate generally to reciprocating pumps, and, in particular, to fluid ends of positive displacement pumps.

BACKGROUND

The present disclosure relates generally to fluid ends for positive displacement pumps such as reciprocating pumps. In oilfield operations, reciprocating pumps are used in different applications such as fracturing the subterranean formation, cementing the wellbore, or treating the wellbore and/or formation. A reciprocating pump typically includes a power end and a fluid end. The fluid end is typically formed of a one-piece construction, or a series of blocks secured together by rods. The fluid end includes an opening for receiving a plunger or plunger throw, an inlet passage, an outlet passage, and an access opening. The opening may be sealed with a cover and a retainer nut that form a portion of a suction or discharge cover assembly. A reciprocating pump designed for fracturing operations is referred to as a frac pump. During operation of a frac pump, a fluid is pumped into the fluid end through the inlet passage and out of the pump through the outlet passage.

Reciprocating pumps are oftentimes operated at pressures of 10,000 pounds per square inch (psi) and upward to 25,000 psi, and at rates of 200 strokes per minute or even higher during fracturing operations. Cyclic fatigue loading of the threads on the retainer nut causes cracks and failures to the threads on the fluid end. Once the crack propagates from the threads of the fluid end to the surface of the front face of the fluid end, the fluid end is taken out of service and considered to be at end of life, which is costly for the customer.

SUMMARY

A first aspect provided herein relates to a fluid end for a reciprocating pump assembly including a fluid end body defining an access opening having access opening threads formed on an inner surface thereof and extending between an inner threaded portion and an outer threaded portion. A blunt start is formed at the outer threaded portion of the access opening threads. The fluid end also includes a retainer nut having retainer nut threads formed on an outer surface of the retainer nut and extending from a first threaded portion to a second threaded portion. To install the retainer nut in the fluid end, the first threaded portion of the retainer nut threads is configured to engage with the access opening threads before the second threaded portion. When the retainer nut is in a fully engaged position in the access opening, the second threaded portion of the retainer nut threads is offset from the blunt start of the access opening threads to define a circumferential offset distance therebetween.

A second aspect provided herein relates to a retainer nut for a fluid end of a reciprocating pump assembly. The retainer nut includes retainer nut threads formed on an exterior surface of the retainer nut and extending between first and second threaded portions. A blunt start is defined at the first threaded portion of the retainer nut threads. A thread end is defined at the second threaded portion of the retainer nut threads. The thread end is positioned at an axial offset distance from a front face of the retainer nut. The blunt start and the thread end define a circumferential offset distance therebetween.

A third aspect provided herein relates to a method of machining a retainer nut. The method includes providing the retainer nut and forming retainer nut threads in the retainer nut circumferentially from a first threaded portion of the retainer nut to a second threaded portion of the retainer nut. The method also includes removing additional material from an end of the retainer nut to define a non-threaded portion of the retainer nut between the second threaded portion and the end of the retainer nut. The method additionally includes forming a thread end at the second threaded portion of the retainer nut threads.

BRIEF DESCRIPTION OF THE DRAWINGS

These and other aspects and features of the present implementations will become apparent to those ordinarily skilled in the art upon review of the following description of specific implementations in conjunction with the accompanying figures.

FIG. 9A is a front perspective view of the fluid end cover assembly of FIG. 2, shown in a fully engaged position, according to another embodiment.

FIG. 9B is a front view of the fluid end cover assembly of FIG. 9A, shown in a fully engaged position, according to another embodiment.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
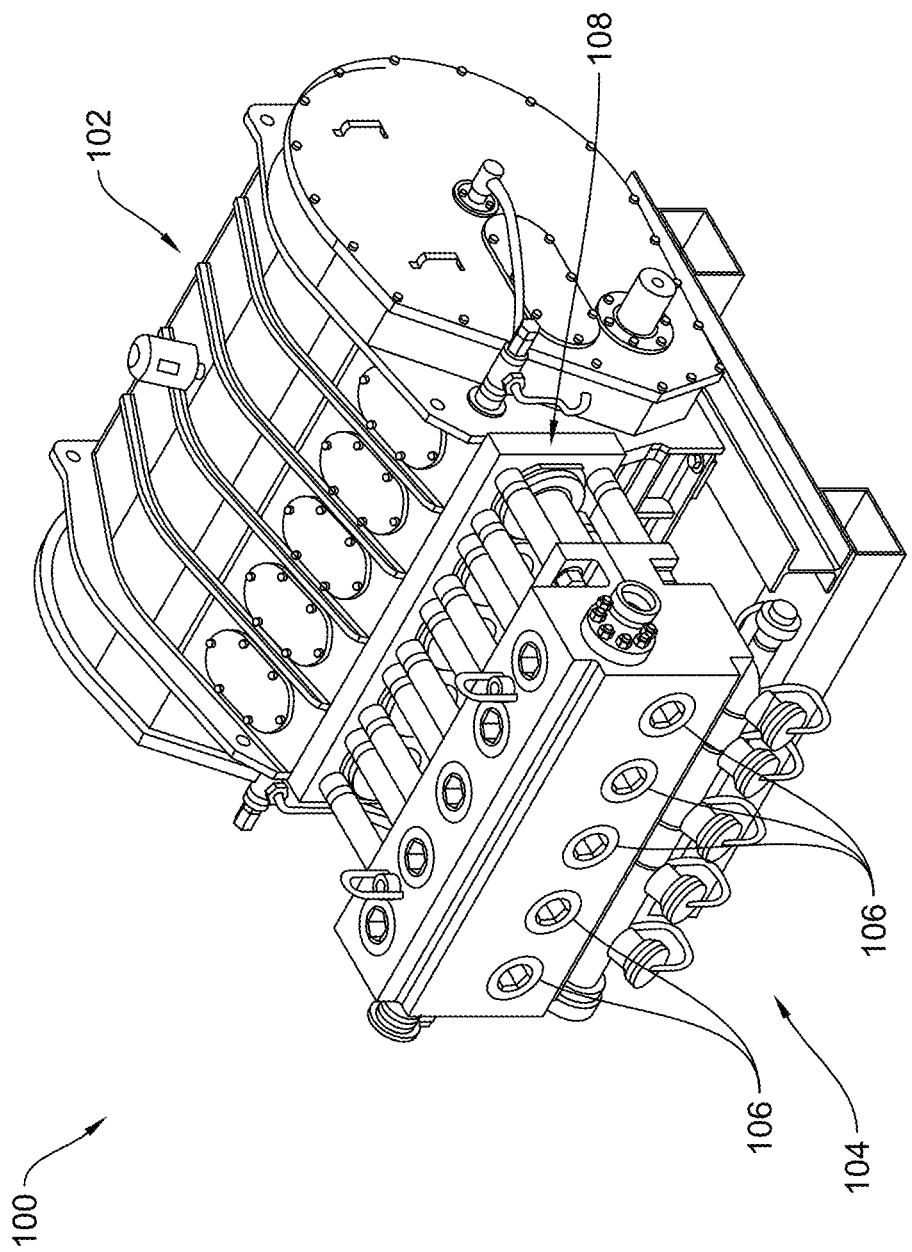
FIG. 1 is a perspective view of an embodiment of a reciprocating pump assembly.

Referring generally to FIG. 1, a reciprocating pump assembly 100 is illustrated having a power end 102 coupled to a fluid end 104 in which one or more retainer nuts 106 are threadingly engaged with fluid end 104 with a reduced thread stress configuration. During operation, the reciprocating pump assembly 100 is configured to pump high pressure fracturing ("frac") fluids into a well for recovery of oil and gas trapped in, for example, shale formations. The power end 102 may be driven by and coupled to, for example, a diesel engine and transmission (not illustrated), to drive and reciprocate a plurality of plungers 108 into and out of the fluid end 104.

Figure 2:
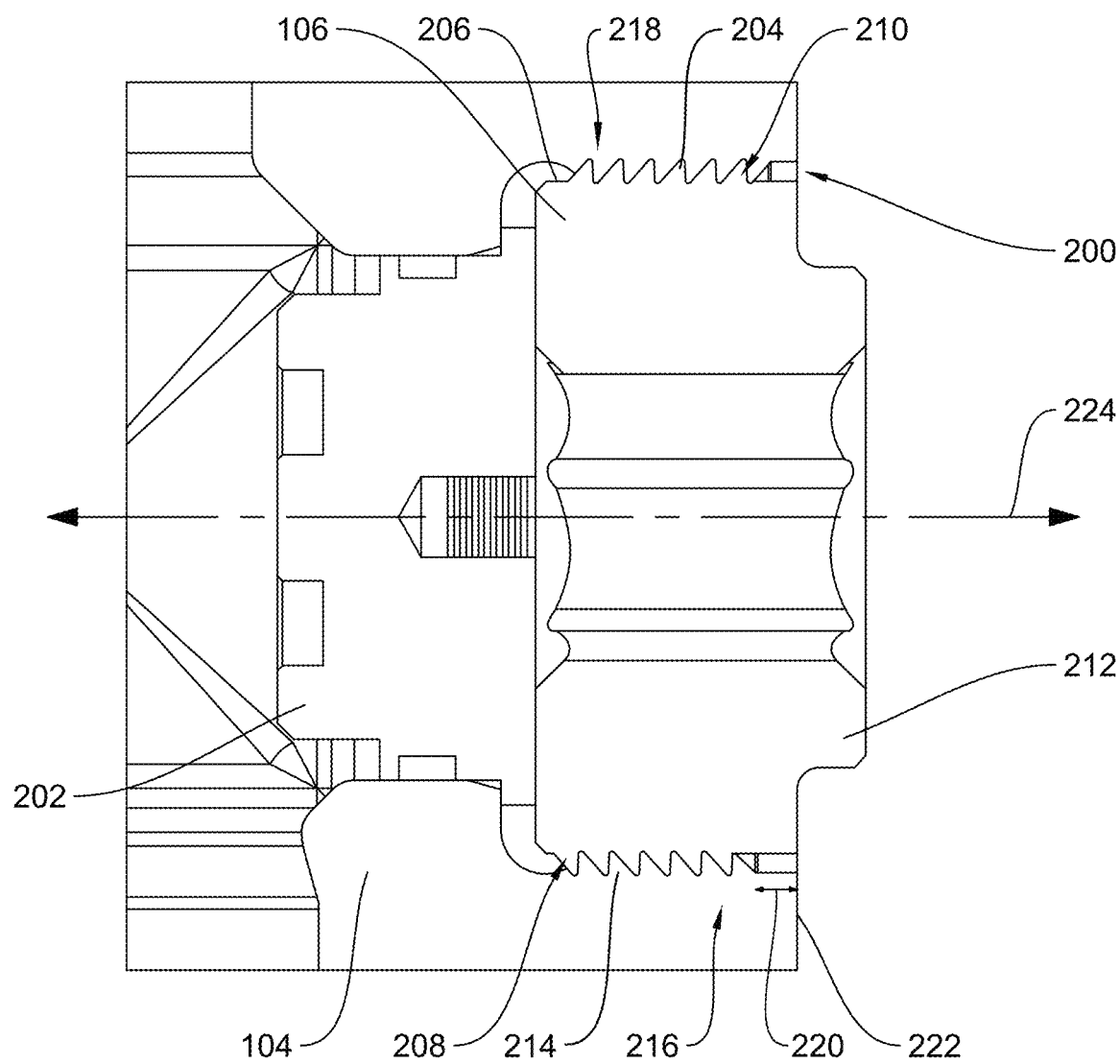
FIG. 2 is a cross-sectional view of a fluid end cover assembly of the reciprocating pump assembly of FIG. 1, taken along line A-A thereof.

As illustrated in FIGS. 1 and 2, a retainer nut 106 is mounted and positioned to enclose one or more access openings 200 and when removed from the access opening 200, facilitates access into the fluid end 104. In various embodiments, the retainer nut 106 is configured to retain a suction cover 202 within the access opening 200. According to some embodiments, the suction cover 202 and the retainer nut 106 are formed as two separate components that are attachable and directly couplable to each other. In other embodiments, the suction cover 202 can be integrally formed with the retainer nut 106 such that the suction cover 202 and retainer nut 106 are formed as a single piece or unitary component.

Figure 3:
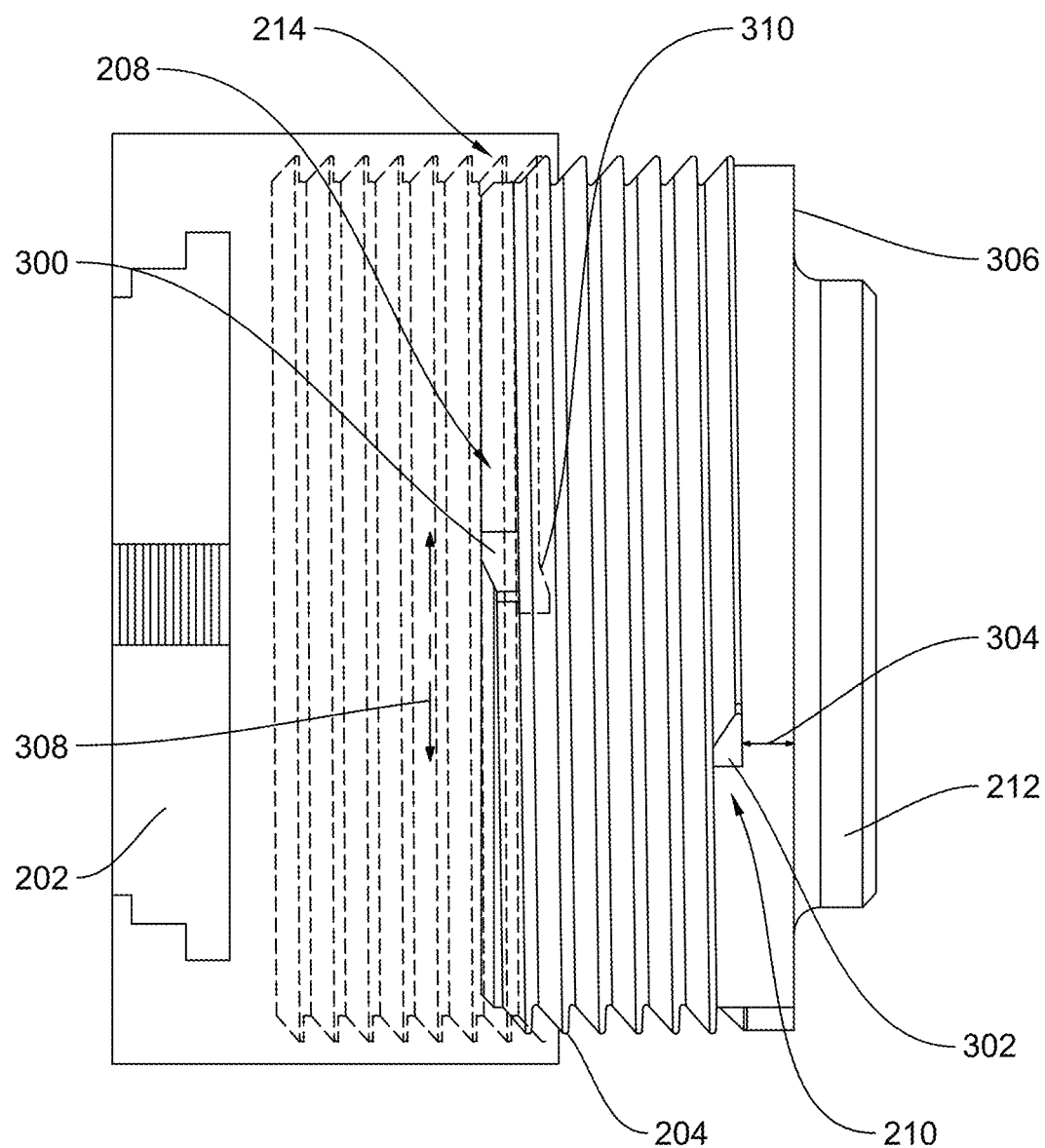
FIG. 3 is a bottom view of the fluid end cover assembly of FIG. 2.

In the embodiment illustrated in FIGS. 1-3, the retainer nut 106 is threadably coupled to the fluid end 104 and includes retainer nut threads 204 formed on an exterior surface 206 of the retainer nut 106 and extending between a first threaded portion 208 (e.g., an inner threaded end or a rear portion) and a second threaded portion 210 (e.g., an outer threaded end or a front portion). The retainer nut 106 may have right-hand or left-hand threads which may facilitate clockwise or counterclockwise threading of the retainer nut 106 into the access opening 200. The retainer nut 106 may have various diameters, with or without the retainer nut threads 204, such as 6¾ inches, 7¾ inches, etc., or any other diameter. As illustrated for example in FIG. 2, the retainer nut 106 may also include a flange 212 extending from the front face of the retainer nut 106 to, among other things, act as a guide to align a gripping tool for an operator to grasp and rotate the retainer nut 106. Some embodiments may not include the flange 212.

With continued reference to FIGS. 1-3, the access openings 200 are formed having interior threads 214 encircling a circumferential surface of the access opening 200 from an access opening first threaded portion 216 (e.g., an outer threaded end or a front portion) to an access opening second threaded portion 218 (e.g., an inner threaded end or a rear portion). When the retainer nut 106 is disposed within the access opening 200, the retainer nut threads 204 are configured to engage with the access opening interior threads 214. According to some embodiments, the interior threads 214 at the access opening second threaded portion 218 may be positioned at a first axial offset distance 220 from a front face 222 of the fluid end 104, measured parallel to an axis 224.

The interior threads 214 of the access openings 200 and the retainer nut threads 204 may be machined into a surface of the fluid end 104 and the retainer nut 106, respectively. The number of threads and/or length of threaded portion of the retainer nut 106 and the access opening 200 may depend on a number of factors, such as for example, a length, width, or orientation of the retainer nut 106 or the access opening 200. When threads are machined into the surface of a material, a starting point and an ending point can be left unmodified and/or sharp, can be made blunt (e.g., a blunt start or a blunt end), and/or can be finished in another manner. In some embodiments, a blunt start may be formed using a Higbee cut. The presence of a Higbee cut on the start of both the interior threads 214 of the access opening 200 and the retainer nut threads 204 reduces or otherwise eliminates the chance of cross threading.

In some embodiments, the components and the thread starts and ends described herein may define various angles, positions, or offset distances with respect to other components or other thread starts and ends. The following description merely presents non-limiting examples of various angles, positions, and offset distances. In other embodiments, the components and the thread starts and ends may be positioned in other ways. For example, as shown in the bottom view in FIG. 3 and the side view in FIG. 4, the retainer nut 106 is oriented in a specific manner to be inserted into the access opening 200. However, in other embodiments, the access opening 200 and/or the retainer nut 106 may be oriented differently, such as turned 90°, 180°, 270°, etc., and therefore the angles, positions, and offset distances described below may vary.

According to some embodiments, a retainer nut thread start 300 (e.g., a blunt start or a Higbee cut start, etc.), as shown in FIG. 3, may be formed at the first threaded portion 208 and a retainer nut thread end 302 (e.g., a blunt end) is formed at the second threaded portion 210. According to embodiments disclosed herein and as explained in greater detail below, the retainer nut thread end 302 is positioned at a second axial offset distance 304 from a front face 306 of the retainer nut 106 measured parallel to the axis 224. As illustrated, the retainer nut thread start 300 and the retainer nut thread end 302 are circumferentially positioned to define a circumferential offset distance 308 therebetween.

Also shown in FIG. 3, an access opening thread start 310 (e.g., a blunt start or a Higbee cut start, etc.) may be formed at the access opening first threaded portion 216. At the access opening second threaded portion 218, an access opening thread end (not shown) of the interior threads 214 may be finished or left unfinished, or may be machined in another manner. For example, the interior threads 214 may be machined into the access opening 200 to a specified depth, such that the interior threads 214 end once the specified depth is reached. As another example, in various embodiments, the length of the access opening may vary, and as such, the access opening thread end may vary.

With continued reference to FIG. 3, as the retainer nut 106 is positioned to be inserted into the access opening 200, the retainer nut thread start 300 and the access opening thread start 310 may be aligned such that the retainer nut thread start 300 can be fed into the interior threads 214. In an embodiment in which the retainer nut thread start 300 and the access opening thread start 310 are both formed into a Higbee cut, the chance of cross threading may be reduced or eliminated.=During manufacture of the retainer nut 106, the retainer nut thread start 300 may be machined in the retainer nut threads 204 at a position between 270° and 330° from the top of the retainer nut 106, such as 300° from the top (e.g., at 10 o'clock, etc.) of the retainer nut 106. As shown in the embodiment in the bottom view in FIG. 3 and the side view in FIG. 4, the retainer nut 106 may be rotated by a user such that the retainer nut thread start 300 is positioned at approximately 180° (e.g., 6 o'clock) for insertion into the access opening 200.

Figure 4:
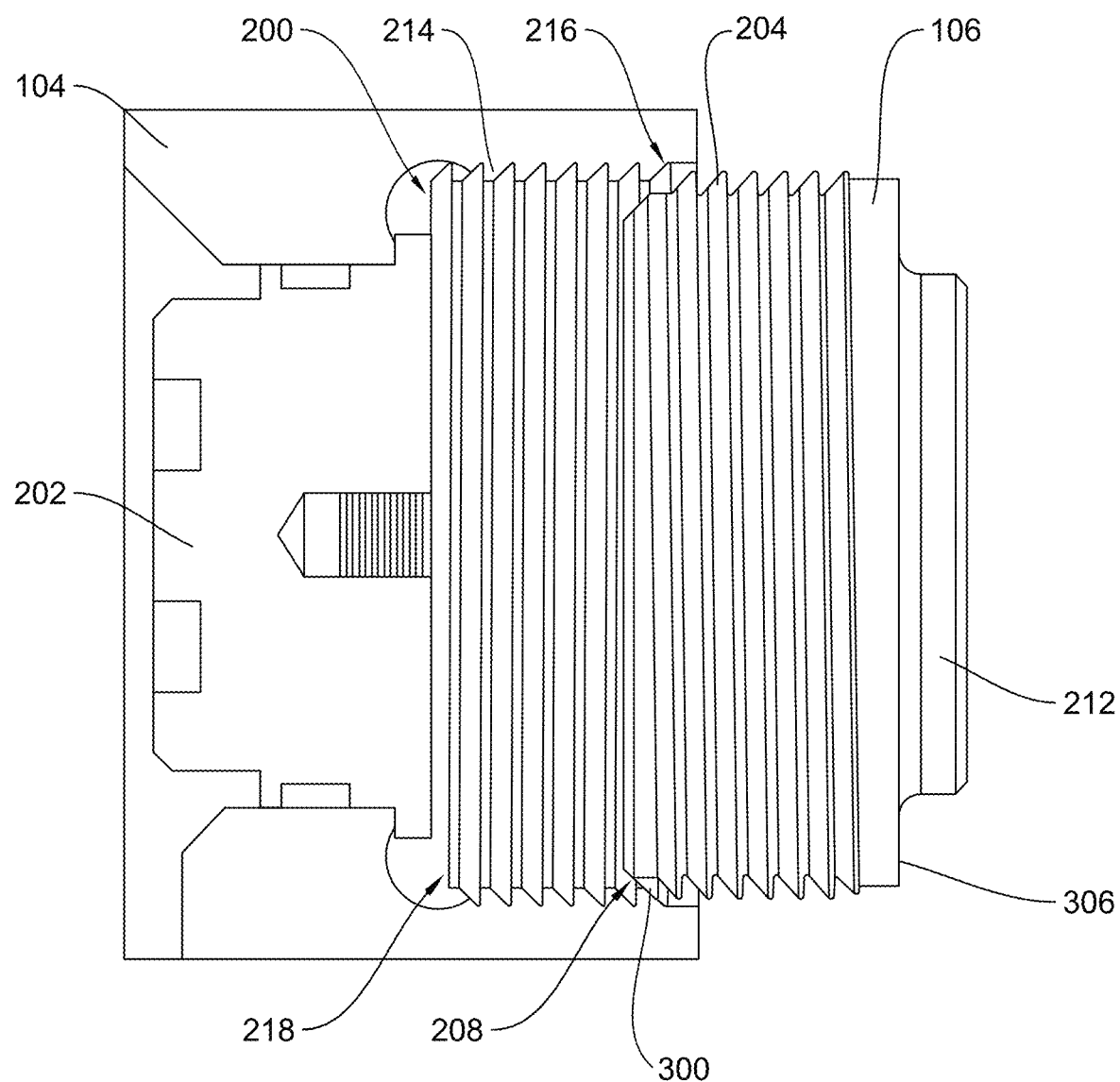
FIG. 4 is a side view of the fluid end cover assembly of FIG. 2.

Additionally and/or alternatively, the access opening thread start 310 may be machined in the interior threads 214 at a position between 150° and 210° from the top of the access opening 200, such as 180° from the top (e.g., at 6 o'clock, at the bottom, etc.) of the access opening 200. When the retainer nut 106 is initially threaded into the access opening 200, for example as shown in FIGS. 3-4, the retainer nut thread start 300 of the retainer nut threads 204 engages with the access opening thread start 310 of the interior threads 214. The retainer nut thread start 300 of the retainer nut threads 204 and the access opening thread start 310 of the interior threads 214 engage at the bottom at the 6 o'clock position (e.g., 180° from the top). In other embodiments, the retainer nut thread start 300 of the retainer nut threads 204 and the access opening thread start 310 of the interior threads 214 may be positioned at another position or angle with respect to any other component.

Figure 5:
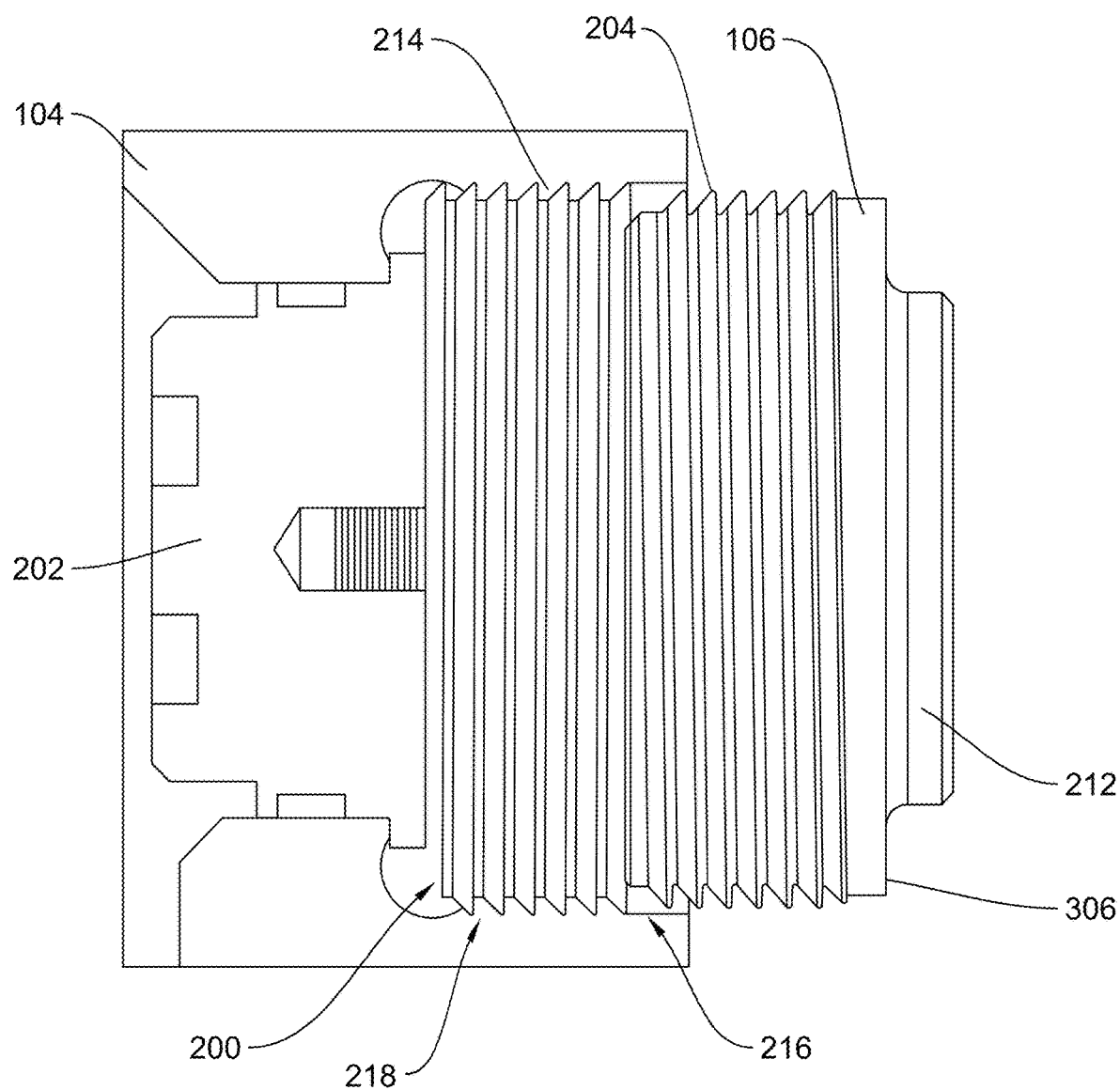
FIG. 5 is a side view of the fluid end cover assembly of FIG. 2, shown in a partially engaged position.
Figure 6:
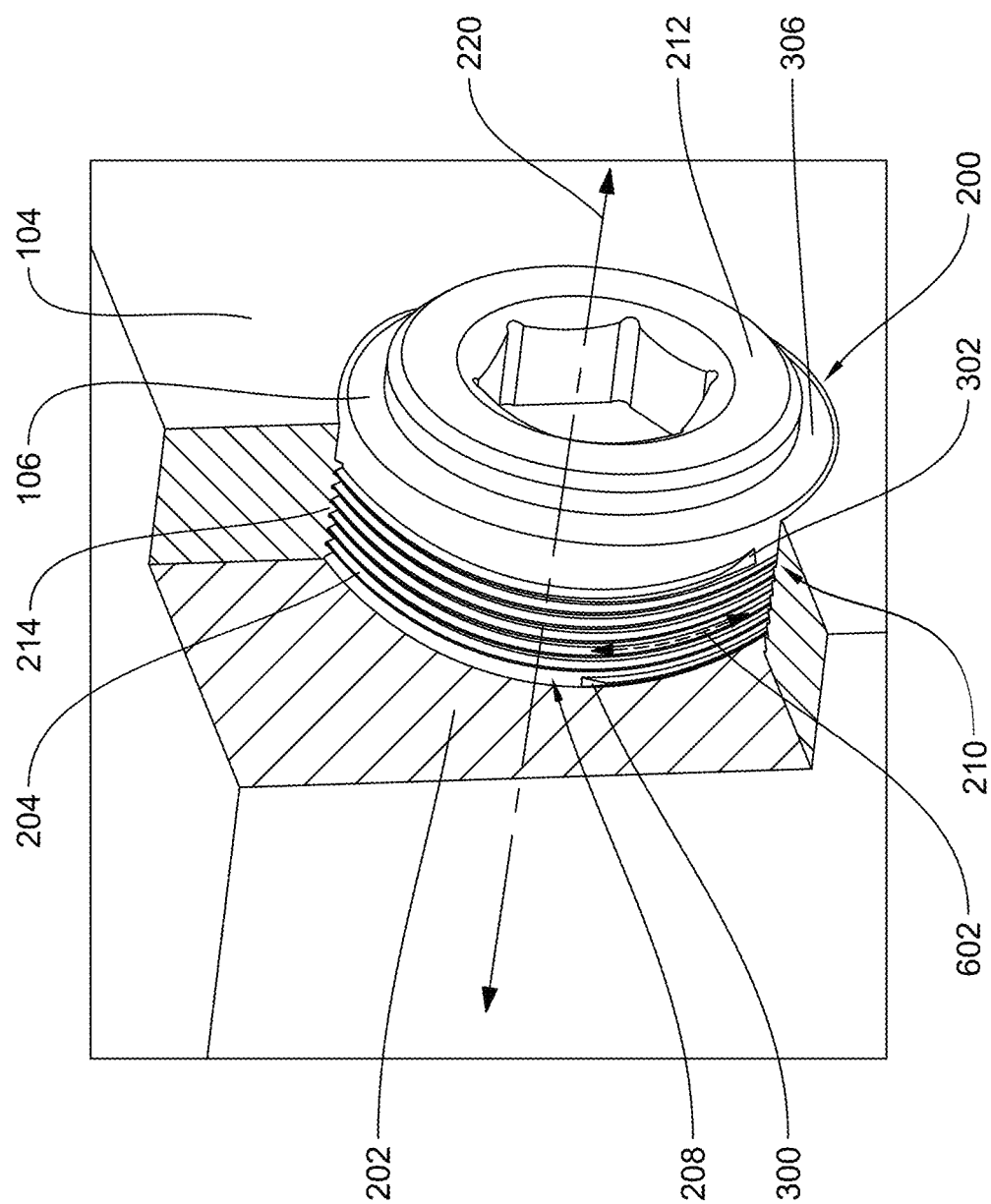
FIG. 6 is a perspective view of the fluid end cover assembly of FIG. 2, shown in a fully engaged position, with a partial cutaway section.

As the retainer nut 106 is rotated clockwise during insertion into the access opening 200, the retainer nut threads 204 further engage with the interior threads 214 of the access opening 200, and the retainer nut thread start 300 and the retainer nut thread end 302 rotate with respect to the access opening thread start 310. As shown in FIG. 5, the retainer nut 106 is partially threaded or screwed (e.g., partially engaged) into the access opening 200 of the fluid end 104. As shown in FIG. 6, the retainer nut 200 is fully threaded or screwed (i.e., fully engaged) into the access opening 200 of the fluid end 104. In the fully engaged position, as shown in the embodiment of FIG. 6, the retainer nut thread start 300 of the retainer nut threads 204 may be proximate or adjacent to the access opening second threaded portion 218 of the access opening 200 and may be positioned approximately between 210° and 270° from the top of the access opening 200, such as 240° from the top (e.g., at 8 o'clock, etc.). In other embodiments, the retainer nut thread start 300 may be positioned at another position or angle with respect to any other component.

At the second threaded portion 210 (e.g., a front portion, towards the front face 306, etc.) of the retainer nut 106, positioned at a distance from the retainer nut thread start 300 of the retainer nut 106, may be the retainer nut thread end 302. The retainer nut thread end 302 may be machined at a position approximately between 270° and 300° from the top of the retainer nut 106 (e.g., between 9 and 10 o'clock, etc.). For example, the retainer nut thread end 302 may extend between approximately 270° and 300° (e.g., 9 and 10 o'clock), such that the retainer nut thread end 302 begins around the 270° (e.g., 9 o'clock) position and ends around the 300° (e.g., 10 o'clock) position. In the fully engaged position as shown in FIG. 6, the retainer nut thread end 302 is positioned approximately between 210° and 300° from the top of the access opening 200, for example, between 210° and 240° (e.g., between 7 and 8 o'clock, etc.), between 240° and 270° (e.g., between 8 and 9 o'clock, etc.), or between 270° and 300° (e.g., between 9 and 10 o'clock, etc.). In other embodiments, the retainer nut thread end 302 may be positioned at another position or angle with respect to any other component.

The angles described herein with respect to the thread starts and ends serve as examples to illustrate the relative distance between the threads starts and ends with respect to other components and other thread starts and ends. According to some embodiments, the retainer nut thread start 300 and the retainer nut thread end 302 may be positioned circumferentially such that a circumferential offset distance 602 is defined therebetween, as best seen in the cutaway view of FIG. 6, in which a portion of the fluid end 104 has been cut away to show the retainer nut 106. For example, the retainer nut thread start 300 may be machined at a 300° position from the top of the retainer nut 200 (e.g., 10 o'clock, etc.), while the retainer nut thread end 302 is around or between a 270° to 300° position from the top of the retainer nut 200 (e.g., 9 to 10 o'clock, etc.). As such, the circumferential offset distance 602 may be 0° to 30°, such as approximately 30°. The circumferential offset distance 308 and the circumferential offset distance 602 may be the same, or may be different, depending upon whether the embodiment includes the retainer nut thread end 302 or a different thread end. In other embodiments, the retainer nut thread start 300 and the retainer nut thread end 302 may be positioned at another position or angle with respect to any other component.

Figure 7:
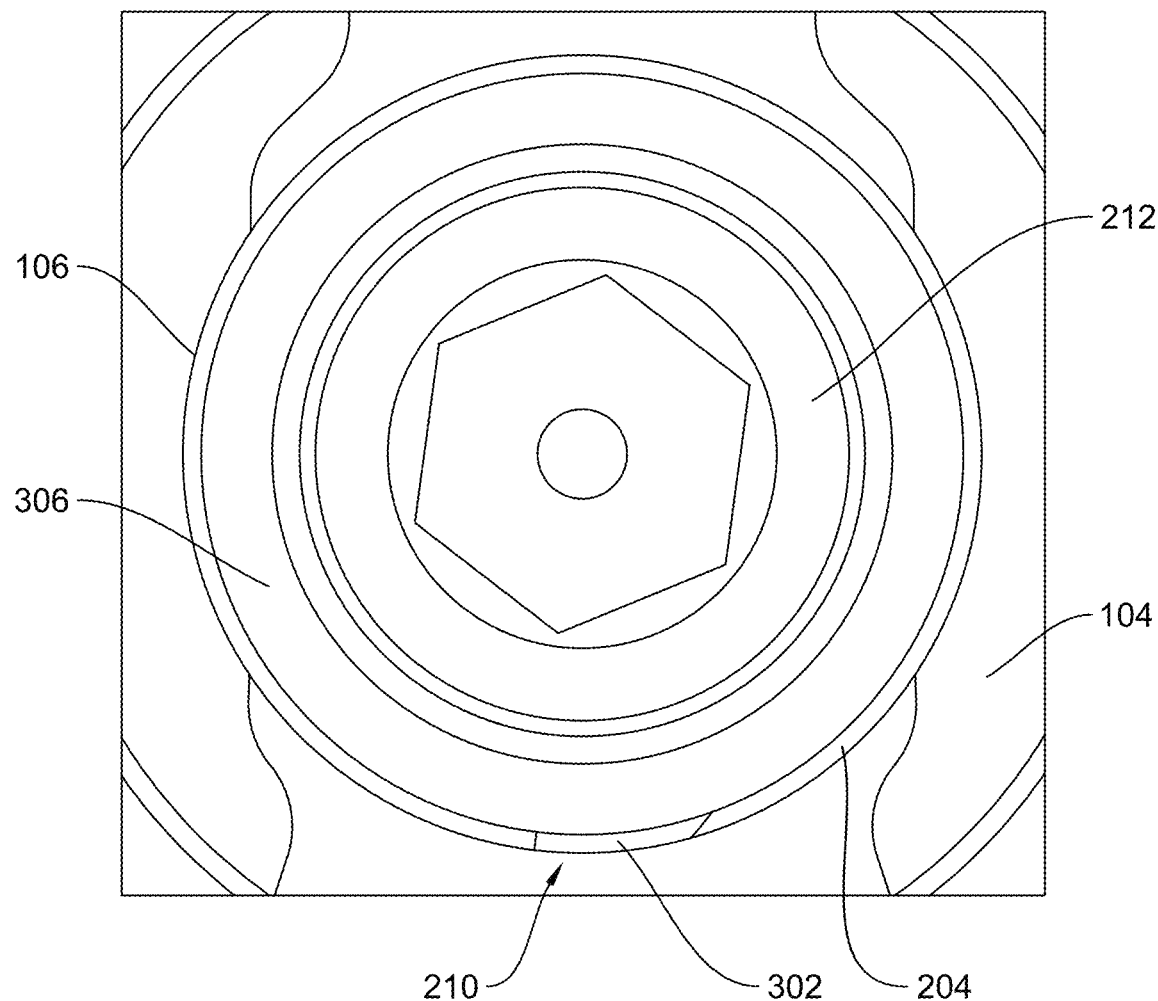
FIG. 7 is a front view of another embodiment of a fluid end cover assembly.

As shown in FIGS. 6 and 7, the retainer nut thread end 302 comprises a portion of one end of the retainer nut threads 204. To create the retainer nut thread end 302, a portion of material of the retainer nut threads 204 is machined and otherwise removed from the retainer nut 106.

Figure 8:
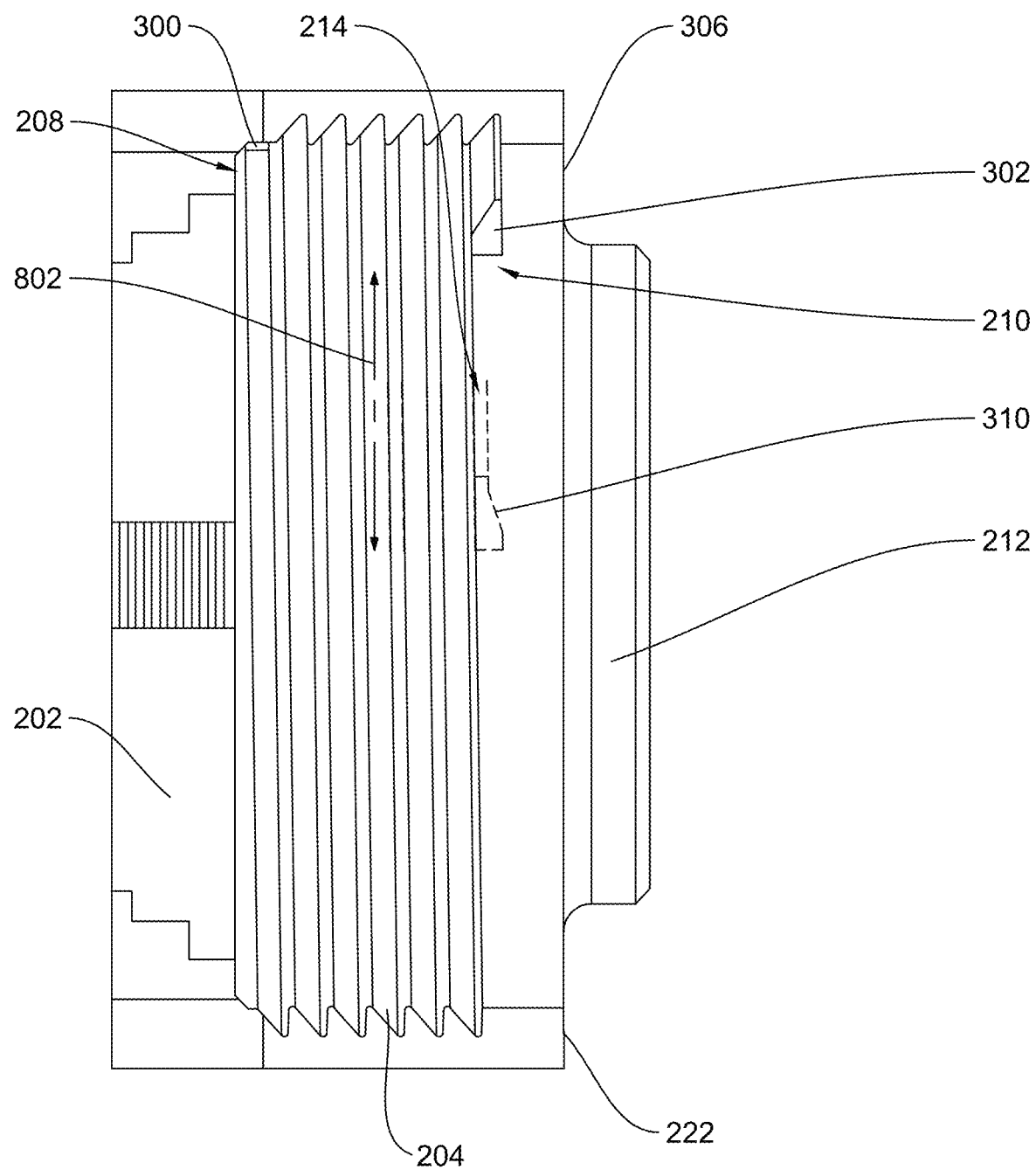
FIG. 8 is a bottom view of the fluid end cover assembly of FIG. 2, shown in a fully engaged position, according to another embodiment.

Turning now to FIG. 8, a bottom view of the retainer nut 106 in the fully engaged position is shown. In the fully engaged position, the front face 306 of the retainer nut 106 may be flush or substantially flush with the front face 222 of the fluid end 104, although the flange 212 may extend past the front face 222 of the fluid end 104. In some embodiments, the interior threads 214 of the access opening 200 and the retainer nut threads 204 may be machined to be offset the same distance from the front face 222 of the fluid end 104 (e.g., the first axial offset distance 220 is the same as the second axial offset distance 304). In other embodiments, the interior threads 214 and the retainer nut threads 204 may be machined to be offset a different distance from the front face 222 of the fluid end 104. For example, as shown in FIGS. 2-8, the retainer nut threads 204 may be machined to be offset substantially the same distance from the front face 222 of the fluid end 104 as the interior threads 214 of the access opening 200.

As shown in FIGS. 8-9B, the retainer nut thread end 302 of the retainer nut threads 204 may not line up or match up with the access opening thread start 310 of the interior threads 214 in the fully engaged position. In some embodiments, when the retainer nut 106 is in the fully engaged position in the access opening 200, the retainer nut thread end 302 of the retainer nut threads 204 is offset from (e.g., stops past) the access opening thread end 310 of the access opening 200 to define a second circumferential offset distance 802. For example, while the access opening thread start 310 of the interior threads 214 may be positioned substantially at 180° from the top of the access opening 200 (e.g., 6 o'clock, etc.), in the fully engaged position, the retainer nut thread end 302 may be positioned around or between 210° to 300° from the top of the access opening 200 (e.g., 7 to 10 o'clock, etc.). The second circumferential offset distance 802 defined between the access opening thread start 310 of the interior threads 214 of the access opening 200 and the retainer nut thread end 302 of the retainer nut threads 204 may be at least 30°, such as approximately 30° to 60°, or more. As such, a length of thread corresponding to, for example, approximately 30° to 60°, or more, of the interior threads 214 at the access opening second threaded portion 216 of the access opening 200 does not engage or is not in contact with the retainer nut threads 204 in the fully engaged position. The configuration of the retainer nut thread end 302 of the retainer nut threads 204 and the second circumferential offset distance 802 between the access opening thread start 310 of the interior threads 214 of the access opening 200 and the retainer nut thread end 302 of the retainer nut threads 204 may allow for the fluid end 104 and the retainer nut 106 to taper from a full stress load to a negligible or zero stress load to prevent cracking, deformation, or destruction of the fluid end 104.

INDUSTRIAL APPLICABILITY

The systems and methods described herein can be used in various use cases, environments, and settings, including various positive displacement pumps such as reciprocating pumps for fracturing operations in oilfield operations such as fracturing the subterranean formation, cementing the wellbore, or treating the wellbore and/or formation, etc.

Figure 10:
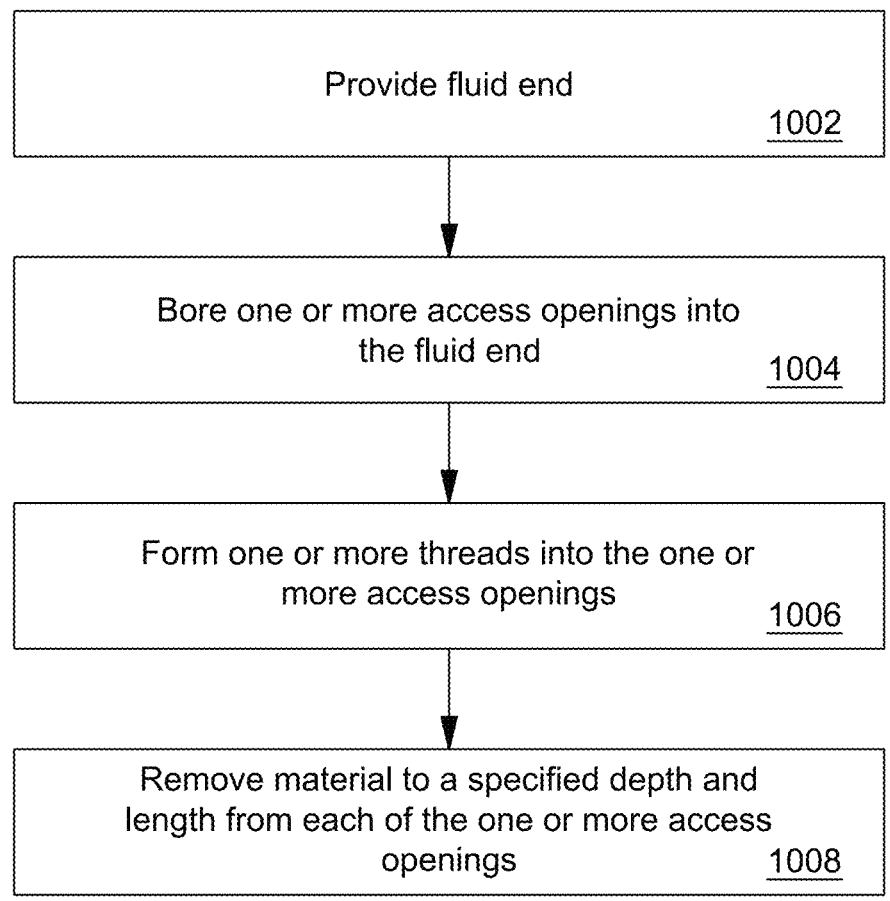
FIG. 10 illustrates a method of machining a fluid end, according to an embodiment.

As shown in FIG. 10, a method 1000 of machining one or more threads (e.g., the interior threads 214) in the access opening 200 of the fluid end 104 may include a number of steps. At a step 1002, the fluid end 104 is provided. At a step 1004, one or more of the access openings 200 are bored into the fluid end 104. At a step 1006, a thread machine may be configured to form (e.g., cut, mold, etc.) one or more threads of a specified thread pitch, height, distance, and/or length. The thread machine may be configured to form threads in the fluid end 104 circumferentially down the length of the access opening 200. In some embodiments, the thread machine may form the threads beginning at the access opening first threaded portion 216 and ending at the access opening second threaded portion 218.

At a step 1008, the thread machine, or another machine, may be configured to remove additional material from the access opening first threaded portion 216 of the access opening 200 of the fluid end 104 to a specified depth and length. For example, the thread machine, or another machine, may be configured to remove one or more threads at the access opening first threaded portion 216. As such, the interior threads 214 will be offset from the front face 222 of the fluid end 104, defining the second axial offset distance 220 therebetween. The thread machine, or another machine, may be configured to cut blunt starts, blunt ends, or other thread starts or ends into the fluid end 104.

Figure 11:
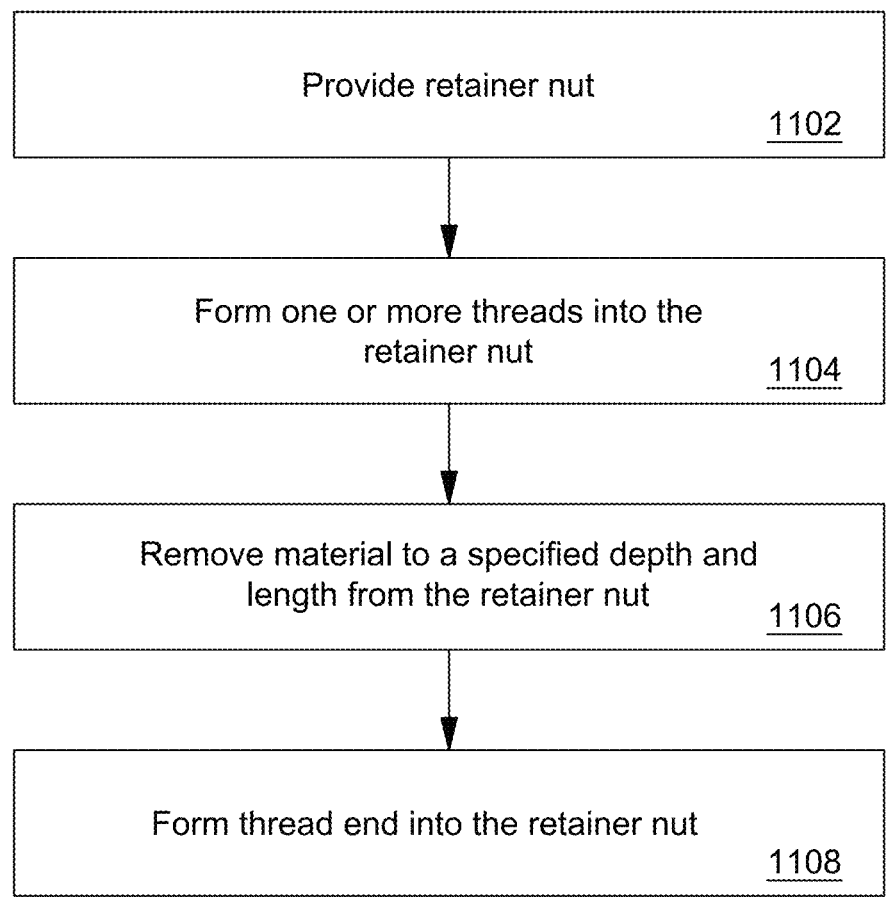
FIG. 11 illustrates a method of machining a retainer nut, according to an embodiment.

Turning now to FIG. 11, a method 1100 of machining one or more threads (e.g., the retainer nut threads 204) on the retainer nut 106 may also include a number of steps. At a step 1102, a retainer nut 106 is provided. At a step 1104, a thread machine may be configured to form (e.g., cut, mold, etc.) one or more threads of a specified thread pitch, height, distance, and/or length. The thread machine may be configured to form threads in the retainer nut 106 beginning at the first threaded portion 208 of the retainer nut 106. The thread machine may be configured to form the threads circumferentially down the length of the retainer nut 106 to the second threaded portion 210 of the retainer nut 106, towards the front face 306.

At a step 1106, the thread machine, or another machine, may be configured to remove additional material from the second threaded portion 210 of the retainer nut 106 to a specified depth and length. For example, the thread machine, or another machine, may be configured to remove one or more threads at the second threaded portion 210 of the retainer nut 106. As such, the retainer nut thread end 302 and/or the retainer nut threads 204 will be offset from the front face 306 of the retainer nut 106, defining the first axial offset distance 304 therebetween. Additionally, at a step 1108, when the additional material is removed from the retainer nut 106, the retainer nut thread end 302 may be formed into the retainer nut 106. The thread machine, or another machine, may be configured to form blunt starts, blunt ends, or other starts or ends into the retainer nut 106. For example, the thread machine, or another machine, may be configured to remove the additional material starting at the second threaded portion 210 of the retainer nut 106 and may continue removing the additional material down the length of the retainer nut 106 in a direction towards the first threaded portion 208 of the retainer nut 106. When the necessary amount of the additional material has been removed from the retainer nut 106, the thread machine, or another machine, may end the removal of the additional material by cutting the retainer nut thread end 302 into the retainer nut 106 at an end of the retainer nut threads 204.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other example embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A fluid end for a reciprocating pump assembly, the fluid end comprising:
   a fluid end body defining an access opening having access opening threads formed on an inner surface thereof and extending between an inner threaded portion and an outer threaded portion;
   a blunt start formed at the outer threaded portion of the access opening threads; and
   a retainer nut having retainer nut threads formed on an outer surface of the retainer nut and extending from a first threaded portion to a second threaded portion, wherein to install the retainer nut in the fluid end, the first threaded portion of the retainer nut threads is configured to engage with the access opening threads before the second threaded portion of the retainer nut threads; and
   wherein, when the retainer nut is in a fully engaged position in the access opening, the second threaded portion of the retainer nut threads is offset from the blunt start of the access opening threads to define a circumferential offset distance therebetween.

2. The fluid end of claim 1, wherein the circumferential offset distance is at least 30°.

3. The fluid end of claim 1, wherein the blunt start of the access opening threads is positioned between 150° and 210° from a top position of the access opening.

4. The fluid end of claim 1, wherein the blunt start of the access opening threads is positioned at approximately 180° from a top position of the access opening.

5. The fluid end of claim 1, further comprising a thread end formed at the second threaded portion of the retainer nut threads.

6. The fluid end of claim 5, wherein the thread end includes a portion of the retainer nut threads where material has been removed from the retainer nut threads.

7. The fluid end of claim 1, further comprising a blunt start formed at the first threaded portion of the retainer nut threads, wherein the blunt start of the retainer nut threads is positioned at approximately 300° from a top position of the retainer nut.

8. The fluid end of claim 5, wherein the thread end is positioned between approximately 270° to 300° from the top position of the retainer nut.

9. The fluid end of claim 5, wherein, when the retainer nut is in the fully engaged position, the thread end of the retainer nut threads is positioned between approximately 210° to 300° from a top position of the access opening.

10. A retainer nut for a fluid end of a reciprocating pump assembly, the retainer nut comprising:
    retainer nut threads formed on an exterior surface of the retainer nut and extending between first and second threaded portions;
    a blunt start defined at the first threaded portion of the retainer nut threads;
    a thread end defined at the second threaded portion of the retainer nut threads, the thread end positioned at an axial offset distance from a front face of the retainer nut;
    wherein the blunt start and the thread end define a circumferential offset distance therebetween.

11. The retainer nut of claim 10, wherein the thread end includes a portion of the retainer nut threads where material has been removed from the retainer nut threads.

12. The retainer nut of claim 10, wherein the circumferential offset distance is at least 30°.

13. The retainer nut of claim 10, wherein the blunt start is positioned at approximately 300° from a top position of the retainer nut.

14. The retainer nut of claim 13, wherein the thread end is positioned between approximately 270° to 300° from the top position of the retainer nut.

* * * * *